(12) United States Patent
Ries et al.

(10) Patent No.: US 8,189,646 B2
(45) Date of Patent: May 29, 2012

(54) SPREAD SPECTRUM SIGNAL

(75) Inventors: Lionel Ries, Toulouse (FR); Jean-Luc Issler, Toulouse (FR); Laurent Lestarquit, Toulouse (FR); Jose-Angel Avila-Rodriguez, Munich (DE); Guenter W. Hein, Holzkirchen (DE)

(73) Assignee: Centre National d'Etudes Spatiales (FR)

( * ) Notice: Subject to any disclaimer, the term of this patent is extended or adjusted under 35 U.S.C. 154(b) by 1287 days.

(21) Appl. No.: 11/813,823

(22) PCT Filed: Jan. 12, 2006

(86) PCT No.: PCT/EP2006/050179
§ 371 (c)(1),
(2), (4) Date: Sep. 19, 2007

(87) PCT Pub. No.: WO2006/075018
PCT Pub. Date: Jul. 20, 2006

(65) Prior Publication Data
US 2008/0137714 A1    Jun. 12, 2008

(30) Foreign Application Priority Data
Jan. 13, 2005    (EP) .................................... 05290083

(51) Int. Cl.
*H04B 1/00* (2006.01)
(52) U.S. Cl. ........ 375/140; 375/145; 375/146; 375/149; 455/98; 455/427
(58) Field of Classification Search ................ 455/3.01, 455/3.02, 403, 422.1, 427, 91, 95, 98, 130, 455/133–137, 140–141, 145–150, 259, 260, 455/295, 316; 375/130, 133–137, 140–150, 375/259, 260, 295, 316
See application file for complete search history.

(56) References Cited

U.S. PATENT DOCUMENTS

| 2005/0012664 A1* | 1/2005 | Gerein ........................ 342/361 |
| 2005/0270997 A1* | 12/2005 | Julien et al. ................. 370/315 |
| 2007/0211791 A1* | 9/2007 | Ganguly et al. ............. 375/148 |

FOREIGN PATENT DOCUMENTS
JP    2002026745 A    1/2002

OTHER PUBLICATIONS

Hein G W et al: "Status of Galileo frequency and signal design" Proceedings of the Institute of Navigation (ION) GPS, Sep. 24, 2002; pp. 266-277, XP002273300.*
Betz J W: "The Offset Carrier Modulation for GPS Modernization" Proceedings of the Ion National Technical Meeting, The Institute of Navigation, US, 1999, pp. 639-648, XP008025723 p. 641, left-hand column, paragraph 2; p. 642, right-hand column, paragraph 1.
International Search Report; PCT/EP2006/050179; Mar. 31, 2006.

* cited by examiner

*Primary Examiner* — David C. Payne
*Assistant Examiner* — James M Perez
(74) *Attorney, Agent, or Firm* — Cantor Colburn LLP

(57) ABSTRACT

A spread-spectrum signal comprises a spreading waveform modulating a carrier wave and containing a real linear combination of a first waveform at a first waveform rate and a second waveform at a second waveform rate, the first waveform rate being distinct from the second waveform rate and both waveform rates being distinct and non-zero. The linear combination of the first and the second waveform is modulated with at least one binary sequence comprising a signal identification code.

27 Claims, 2 Drawing Sheets

SPREAD SPECTRUM SIGNAL

TECHNICAL FIELD OF THE INVENTION

The present invention generally relates to the field of signal modulation, in particular with regard to satellite navigation systems. The invention further concerns a method for producing a spread-spectrum signal and appropriate techniques for receiving such a spread-spectrum signal, in particular with regard to satellite navigation systems.

BRIEF DESCRIPTION OF RELATED ART

The use of spread-spectrum techniques for radionavigation or communication is well known in electrical engineering. This technology is e.g. advantageous in applications requiring high reliability in noisy environment. Furthermore, due to the limited availability of spectrum allocations, efficient use of frequency bands has become desirable.

The implementation of new signals in a given frequency band must satisfy the constraint of causing minimal distortion of existing signals. The question of spectral isolation is e.g. an important issue with regard to the interoperability of the Galileo satellite system and the existing Global Positioning System. Diverse spread-spectrum techniques were put forward, including direct sequence spread spectrum or frequency hopping.

Some modulation techniques in the domain of satellite navigation systems employ binary offset carrier (BOC) signals. These signals result from modulation of a non-return to zero pseudo-random noise code by a square waveform. A BOC modulation having a subcarrier frequency of m×1.023 MHz and modulated by a pseudo-random noise code at the rate of n×1.023 Mcps ($10^6$ chips per second) is denoted as BOC(m, n). A BOC(10, 5) is e.g. achieved by modulating a square waveform having a subcarrier frequency of 10.23 MHz with a pseudo-random noise code having a chip rate of 5.115 Mcps; the chip transitions are synchronised with transitions of the square waveform. Each chip of the pseudo-random noise code is thus applied to m/n cycles of the square waveform. Spread-spectrum signals obtained by BOC-modulation of a carrier wave exhibit very low spectral power density at the carrier frequency. As a result, when transmitted on L1, they are compatible with the GPS C/A signal, which peaks at the centre frequency of the L1 band. Nevertheless, as the L1 frequency band is allocated to the GPS P(Y) signal and the GPS M-code, great efforts have to be made in order to keep interference of new signals with existing signals low.

In *BOC Modulation waveforms*, A. R. Pratt et al., ION GPS September 2003, the use of waveforms is discussed, which are step-like approximations of a sinusoid to modulate the carrier wave. A binary waveform can be considered as a crude step-like approximation of a sinusoid. By introducing more levels, Pratt et al. realise spreading waveforms, having a shape closer to a sinusoid. Such spreading exhibit attenuated, sometimes eliminated harmonics of the subcarrier waveform with respect to a BOC(m, n) waveform; in other terms, the power level of certain secondary lobes is reduced. The higher the number of waveform levels is, the more harmonics are filtered. When the number of levels tends to infinity, the spreading waveform approaches a sinusoid, which results in a LOC (linear offset carrier) signal without harmonics. The described technique is applied to constant envelope modulation using a 5-level subcarrier. In this case, the full modulation takes the shape of an 8PSK (8-phase-shift keying) modulation.

It is well known in the field of radionavigation that filtering or reducing the secondary lobes of a signal also degrades the synchronisation capabilities (or tracking performances) of this signal, which reduces the positioning accuracy. The technique discussed above and similar ones do not escape this rule. Although approximating a sinusoidal waveform provides an efficient and elegant way of improving spectral isolation of some signals (for example the GPS M-Code when applied to a BOC(2,2) signal), it does so to the disadvantage of overall tracking performances.

A further challenge in signal modulation techniques is elimination of time-varying amplitude components of the modulation. Amplitude variations give rise to undesired AM-to-AM and AM-to-PM distortions when the signal is processed by nonlinear components (e.g. amplifiers).

SUMMARY OF THE INVENTION

The invention provides a spread-spectrum signal, which combines a high level of spectral control with good overall synchronisation capabilities.

The invention also provides a method for generating such a spread-spectrum signal.

The invention further provides a receiver capable of acquiring such a spread-spectrum signal.

A spread-spectrum signal comprises at least one spreading waveform, which modulates a carrier wave. According to an important aspect of the invention, the spreading waveform comprises a real linear combination of a first binary waveform at a first waveform rate and at least a second binary waveform at a second waveform rate, both waveform rates being distinct and non-zero. The amplitude of the second waveform preferably differs from the amplitude of the first waveform. The linear combination of the first and the second waveform is modulated with at least one binary sequence comprising a signal identification code.

The term "real linear combination" in the context of the present invention has to be understood as equivalent to the following property:

$\alpha \cdot w_1(t) + \beta \cdot w_2(t)$ representing said real linear combination of the first waveform $w_1(t)$ and second waveform $w_2(t)$, with coefficients $\alpha$ and $\beta$ and the time variable t, $[\alpha \cdot w_1(t)]/[\beta \cdot w_2(t)]$ is a real number at any moment t and both coefficients $\alpha$, $\beta$ are non-zero.

Compared with a conventional BOC waveform at the first waveform rate, the present spreading waveform has improved tracking capabilities due to the presence of the second waveform at a higher waveform rate. The spectrum of the spreading waveform depends on the respective spectra of the first and the second waveform. By varying the relative amplitudes of the first and the second waveform, one can adjust the shape of the spreading waveform spectrum. With regard to prior approaches of spectral shaping, the present signal has the additional advantage that different lobes in the spectrum of the spreading waveform can be accessed individually. This insures spectral isolation to other signals in the same frequency band while maintaining tracking performances. When compared to a BOC-modulated signal the tracking performances are even enhanced. It will be appreciated that the relative amplitudes of the first and the second waveform may themselves vary in time or remain constant. The timescale of this variation is much larger than the timescale of signal oscillations. Preferably, such variations occur at a rate substantially lower than the rate of the binary sequence, e.g. 1 Hz. On the short time-scale, the time-dependency of the coefficients in the linear combination can thus be neglected.

The first waveform and/or the second waveform are preferably binary offset carrier (BOC) waveforms or binary coded symbol (BCS) waveforms. The spreading waveform thus takes the shape of a crenellated waveform. If the relative amplitudes are suitably chosen, the spreading waveform roughly follows the course of the first waveform. A simple receiver designed for acquiring and tracking a binary signal at the frequency of the first waveform can track the composite spread-spectrum signal. In order to benefit from the full synchronisation capacities of the spreading waveform, the receiver should also be compatible with the bandwidth of the second waveform.

Advantageously, the second waveform rate is an integer multiple of the first waveform rate and more advantageously, the second waveform rate is between 2 and 24 times the first waveform rate. Transitions in the first and the second waveforms may be synchronised or deliberately offset.

It will be appreciated that the binary sequence may further comprise information data, such as e.g. satellite navigation data, signal integrity data or commercial data. Information can be encoded at a bit rate substantially lower than the chip rate of the pseudo-random binary sequence. The binary sequence can be produced by providing a determined or bespoken binary sequence, which is modulated with a message sequence.

The binary sequence may comprise code chips at a certain chip rate Rc, the first waveform rate Fsc being such that Fsc=m·Rc/2 with m being an integer number. The first waveform rate is preferably higher than or equal to the chip rate and code transitions are preferably synchronised with transitions of the first waveform.

In a preferred embodiment of the spread-spectrum signal, an in-phase component of the carrier wave is modulated with a first spreading waveform $s_1(t)$ of the form $$s_1(t) = [a \cdot w_1(t) + b \cdot w_2(t)] \cdot PRN_1(t)$$

and a quadrature component of the carrier is modulated with a second spreading waveform $s_2(t)$ of the form $$s_2(t) = [a \cdot w_1(t) - b \cdot w_2(t)] \cdot PRN_2(t).$$

In these equations, t is a time variable, a and b are real, non-zero coefficients, $w_1(t)$ is a first binary waveform at a first waveform rate, $w_2(t)$ is a second binary waveform at a second waveform rate. The first waveform rate is different from the second waveform rate. $PRN_1(t)$ represents a first binary sequence and $PRN_2(t)$ a second binary sequence. The two binary sequences may be different from each other or equal. The complex modulation waveform s(t) is given by $s(t)=s_1(t)+i \cdot s_2(t)$, i representing the imaginary unit, from which immediately follows that the envelope of s(t) is invariant in time: $|s(t)|=\sqrt{2(a^2+b^2)}$. Constant envelope modulation is important for avoiding AM-to-AM and AM-to-PM distortions in a nonlinear component, e.g. an amplifier. As mentioned above, the coefficients a and b may vary on a timescale which is long in comparison to typical variations of the spreading waveforms.

In another preferred embodiment of the spread-spectrum signal the in-phase component of the carrier wave is modulated with a first spreading waveform $s_1(t)$, which is given by the equation $$s_1(t) = PRN_1(t) \cdot (\cos\theta_1 \cdot w_1(t) + \cos\theta_2 \cdot w_2(t))/2 + PRN_2(t) \cdot (\cos\theta_1 \cdot w_1(t) - \cos\theta_2 \cdot w_2(t))/2,$$

and the quadrature component of the carrier is modulated with a second spreading waveform $s_2(t)$, which is given by the equation.

$$s_2(t) = (\sin\theta_1 + \sin\theta_2) \cdot PRN_3(t) \cdot w_3(t)/2 - PRN_1(t) \cdot PRN_2(t) \cdot PRN_3(t) \cdot w_3(t) \cdot (\sin\theta_2 - \sin\theta_1)/2$$

In these equations, t is a time variable, $\theta_1$ and $\theta_2$ are real angles, $w_1(t)$ is a first binary waveform at a first waveform rate, $w_2(t)$ is a second binary waveform at a second waveform rate, $w_3(t)$ is a third binary waveform, $PRN_1(t)$ is a first binary sequence, $PRN_2(t)$ is a second binary sequence and $PRN_3(t)$ is a third binary sequence. The first waveform rate is different from the second waveform rate. It will be appreciated that this complex modulation $s(t)=s_1(t)+i \cdot s_2(t)$ also has a constant envelope $|s(t)|$. $\theta_1$ and $\theta_2$ may change slowly with respect to the spreading waveform.

The invention further provides a navigation signal system e.g. a global navigation satellite system with a spread-spectrum signal as discussed above, wherein said first waveform is a BOC(1, 1) and said second waveform is a binary waveform having a rate of 10.23 Mcps, 12.276 Mcps, 15.345 Mcps or 30.69 Mcps (e.g. a BOC(5, 1), a BCS([1 1 1 1 1-1 1 1 1 1 1], 1), a BCS([1 1 1 1 1 1 1 1-1 1 1 1 1 1 1], 1), respectively a BOC(15, 1)). The binary sequence may comprise identification data of the signal source, which may be ground-based (e.g. pseudolites) or airborne: in case of a global or regional satellite navigation signal system, the binary sequence may comprise satellite identification data, e.g. ranging codes and satellite information data such as e.g. navigational data for use in a positioning algorithm.

It is further provided a method for producing a spread-spectrum signal, having the following steps:
    providing a first waveform at a first waveform rate and a second waveform at a second waveform rate; the first waveform rate is chosen different from the second waveform rate and both waveform rates are non-zero;
    providing a binary sequence with at least one signal identification code;
    forming a linear combination of the first waveform and the second waveform, the linear combination being modulated with the binary sequence and
    using the resulting waveform as spreading waveform for modulating the carrier wave.

As will be apparent, forming a modulated linear combination of the first and the second waveform can be achieved in two equivalent ways: either the unmodulated first and second waveforms are first combined and the resulting sum or difference is modulated with the binary sequence, or the first and second waveforms are modulated and subsequently linearly combined.

The method allows shaping of the signal spectrum so as to respect certain thresholds of spectral isolation (for example a certain spectral separation coefficient (SSC) to another signal), while increasing its synchronisation capabilities.

The first waveform and/or the second waveform are preferably binary offset carrier waveforms or binary coded symbol (BCS) waveforms.

The method can comprise the step of modulating the second waveform with a second binary sequence different from the binary sequence modulating the linear combination of the waveforms. Hence it is possible to combine two different binary or pseudo-random sequences in one signal.

According to another aspect of the invention, a method for receiving a spread spectrum signal is provided, which comprises the steps:

- generating a local code replica of the binary sequence;
- generating a local replica of the first waveform and a local replica of the second waveform;
- performing a first correlation of incoming electromagnetic waves with the local replica of the first waveform and the local code replica;
- performing a second correlation of incoming electromagnetic waves with the local replica of the second waveform and the local code replica;
- linearly combining the first correlation and the second correlation.

Alternatively, the method for receiving a spread spectrum signal can comprise the steps:

- generating a local code replica of said binary sequence;
- generating a local replica of said first waveform and a local replica of said second waveform;
- performing a linear combination of said local replica of said first waveform with said local replica of said second waveform;
- correlating incoming electromagnetic waves with the linear combination of local replicas and the local code replica.

According to yet another important aspect of the present invention, a receiver for acquiring a spread-spectrum signal is provided. The receiver comprises means for generating a local code replica of the binary sequence, a first waveform generator for generating a local replica of the first waveform, a second waveform generator for generating a local replica of the second waveform, means for correlating incoming electromagnetic waves with the local replica of the first waveform and the local code replica for forming a first correlation result, means for correlating incoming electromagnetic waves with the local replica of the second waveform and the local code replica for forming a second correlation result and means for linearly combining the first and second correlation results.

Alternatively, the receiver may comprise means for generating a local code replica of the binary sequence, a first waveform generator for generating a local replica of the first waveform, a second waveform generator for generating a local replica of the second waveform, means for forming a linear combination of the local replica of the first waveform and the local replica of the second waveform and means for correlating incoming electromagnetic waves with the linear combination of local replicas and the local code replica.

As will be appreciated, the local code replica of the binary sequence may be an exact copy of the known part of the binary sequence used for modulation; if the binary sequence comprises a message not determined a priori, this message will not appear in the local code replica. The same observation holds for the first or the second waveform replicas.

In a preferred embodiment, the receiver comprises a tracking loop, e.g. a delay-locked loop and/or a phase-locked loop to track the received signal and/or a frequency-locked loop. The tracking loop can be arranged in the receiver so as to be capable of tracking the first waveform and/or the second waveform and/or a linear combination thereof. Optionally, the tracking loop can also track the carrier wave. A delay-locked loop may be arranged so as to be capable of tracking the first respectively the second waveform and a phase-locked loop and/or a frequency-locked loop may be arranged so as to be capable of tracking the second respectively the first waveform. Alternatively, the phase-locked loop and/or the frequency-locked loop is arranged so as to be capable of tracking a linear combination of the first and the second waveform.

The receiver can be implemented into a global navigation satellite signal receiver. In this case, the first waveform generator is advantageously capable of generating a BOC(1, 1) waveform while the second waveform generator is capable of generating a binary waveform having a rate of 10.23 Mcps or 12.276 Mcps, 15.345 Mcps or 30.69 Mcps (e.g. a BOC(5, 1), a BCS([1 1 1 1 1 1-1 1 1 1 1 1], 1), a BCS([1 1 1 1 1 1 1 1-1 1 1 1 1 1 1], 1), respectively a BOC(15, 1)). The local code replica preferably comprises satellite identification data such as e.g. the ranging codes.

BRIEF DESCRIPTION OF THE DRAWINGS

Preferred embodiments of the different aspects of the invention will now be described with reference to the accompanying drawings in which.

DETAILED DESCRIPTION OF THE INVENTION

Figure 1:
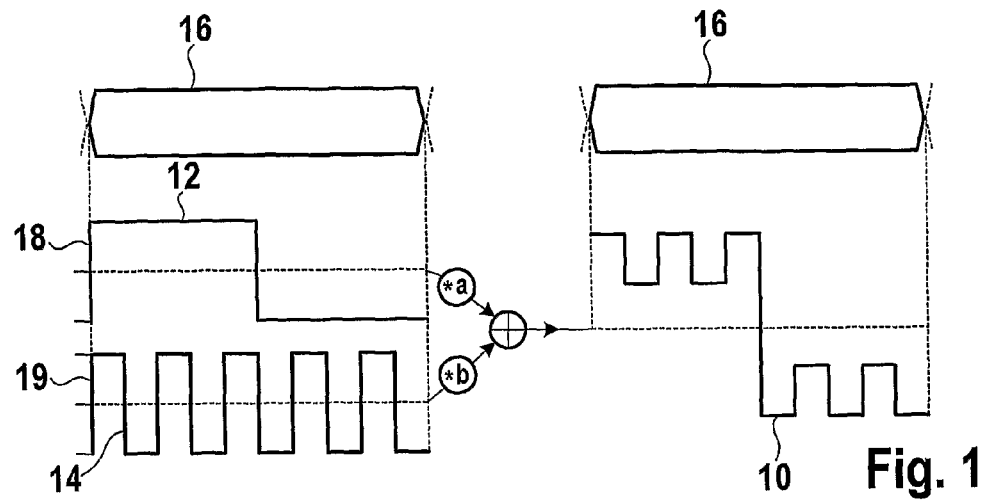
FIG. 1: is a schematic diagram of a spreading waveform used for modulating a carrier wave.

Referring to FIG. 1, an example of a spreading waveform 10 for modulating a carrier wave is discussed in more detail. In this embodiment, the spreading waveform 10 is obtained by coherently summing a first binary waveform 12 formed by a BOC(m1, n) multiplied by a first coefficient a, and a second binary waveform 14 formed by a BOC(m2, n) multiplied by a second coefficient b. The BOC(m2, n) waveform could advantageously be replaced by a more general binary waveform, like a BCS e.g. a BCS([1-1 1 1 1 1 1 1 1 1], 1]). As seen in FIG. 1, the spreading waveform 10 has a crenellated shape. The same code 16 is applied to both waveforms. In other words, the first waveform 12 and the second waveform 14 are modulated with a single binary code sequence 16 according to the formula:

$$s(t) = (a \cdot w_1(t) + b \cdot w_2(t)) \cdot PRN(t).$$

This is also written as:

$$s(t) = a \cdot w_1(t) \cdot PRN(t) + b \cdot w_2(t) \cdot PRN(t),$$

where t represents a time variable, s(t) is the resulting spreading waveform 10, $w_1(t)$ is the first binary waveform 12, $w_2(t)$ is the second binary waveform 14, PRN(t) is a binary pseudo-random noise sequence 16 and a and b are coefficients. In the present description, we use the convention that binary functions or sequences either take the value +1 or −1. Accordingly, the multiplication of two binary values in this convention corresponds to the logical XOR (exclusive OR) operation or "modulo-2-addition" in other conventions, where the binary values are TRUE or FALSE, respectively 0 or 1.

In the present example, the waveform rate of the second binary waveform 14 is five times higher than the waveform rate of the first binary waveform 12. The timing offset between a rising edge 18 of the first waveform 12 and a rising edge 19 of the second waveform 14 can be chosen in the interval $[-T_2/2, T_2/2]$, where $T_2$ represents the duration of a cycle of the second binary waveform 14. In FIG. 1, the offset is set to 0.

The relative amplitudes of the two binary waveforms 12, 14 can be varied. In case of a BOC(1, 1) and a BOC(5, 1), raising the amplitude of the BOC(5, 1) relatively to the amplitude of the BOC(1, 1) results in mainly increasing the spectral power of the fifth harmonic of the BOC(1, 1). In the present example, the amplitude b of the second binary waveform 14 was chosen to be lower than the amplitude a of the first binary waveform 12, so that the resulting spreading waveform 10 keeps high similarity to the first binary waveform 12. In this case, a receiver designed for tracking the first binary waveform 12 alone is normally capable of tracking the spreading waveform 10 comprising the linear combination of the first binary waveform 12 and the second binary waveform 14. By suitably choosing the relative amplitudes a, b, the spreading waveform 10 of this example is therefore kept compatible with receivers designed for a square waveform at the waveform rate of the first waveform 12. It has to be noted however that the increased synchronisation capabilities of the composite spreading waveform 10 cannot be accessed with a receiver, which is not adapted to both waveforms 12, 14. The improved performances of the spreading waveform 10 can be expressed with the rms-bandwidth (rms: root mean square). Consider $$\int f^2 \cdot DSP_{w2}(f) df > \int f^2 DSP_{w1}(f) df,$$

where $DSP_{w1}(f)$ respectively $DSP_{w2}(f)$ is the spectrum of a signal processed with the first waveform 12, respectively the second waveform 14. The rms-bandwidth of the combined spreading waveform 10 is thus higher than the rms-bandwidth of the first waveform 12.

A spreading waveform 10 as presented above can be used for constant envelope modulation of a carrier wave. While non-constant envelope modulation of a carrier wave is relatively straightforward, constant envelope modulation is more complex, as the modulation scheme depends on the number of useful channels to be transmitted on the modulation.

As discussed in *Binary Coded Symbol Modulation for GNSS*, C. Hegarty et al., ION GPS June 2004, constant envelope modulation of only one channel with a complex 4-level sub-carrier can be reached using unbalanced quadrature phase shift keying (QPSK) with one waveform in phase and the other in quadrature as in the following expression:

$$s(t)=[a \cdot w_1(t)+i \cdot b \cdot w_2(t)] \cdot PRN(t),$$

where i represents the imaginary unit, t is a time variable, s(t) is the resulting waveform, $w_1(t)$ is a first, $w_2(t)$ is a second binary waveform, a and b are real coefficients and PRN(t) is a pseudo-random binary sequence. It follows that $|s(t)|=\sqrt{a^2+a^2}$, which is independent of time.

Other solutions exist if more than one channel is to be transmitted. In the case that two real signals $s_1(t)$ and $s_2(t)$ having a 4-level-waveform are to be modulated onto a carrier wave using constant envelope modulation, the following solution is proposed, wherein the in-phase component of the carrier wave is modulated with a first spreading waveform $s_1(t)$ and the quadrature-phase component of the carrier wave is modulated with a second spreading waveform $s_2(t)$:

$$s_1(t)=[a_1 \cdot w_1(t)+b_1 \cdot w_2(t)] \cdot PRN_1(t),$$

$$s_2(t)=[a_2 \cdot w_1(t)-b_2 \cdot w_2(t)] \cdot PRN_2(t),$$

where $w_1(t)$ and $w_2(t)$ are binary waveforms, t is a time variable, $a_1$, $a_2$, $b_1$, and $b_2$ are real coefficients, and where $PRN_1(t)$ and $PRN_2(t)$ are pseudo-random binary sequences. The resulting complex modulation waveform s(t) being given by the equation:

$$s(t)=s_1(t)+i \cdot s_2(t),$$

it follows that the envelope of s(t) is invariant in time, for example, if $a_1=a_2$ and $b_1=b_2$, i.e. $|s(t)|=\sqrt{2(a_1^2+b_1^2)}$.

Similarly, constant envelope modulation is also possible with three real spreading waveforms modulated onto a carrier wave. Consider $$s_1(t)=[a \cdot w_1(t)+b \cdot w_2(t)] \cdot PRN_1(t),$$

$$s_2(t)=[a \cdot w_1(t)-b \cdot w_2(t)] \cdot PRN_2(t),$$

$$s_3(t)=w_3(t) \cdot PRN_3(t),$$

where $w_1(t)$, $w_2(t)$ and $w_3(t)$ are binary waveforms, a and b are real coefficients, and where $PRN_1(t)$, $PRN_2(t)$, $PRN_3(t)$ are pseudo-random binary sequences. One can assume for a and b: $a=\cos(\theta_1)/2$ and $b=\cos(\theta_2)/2$. The complex modulation waveform s(t) can thus be written in the form:

$$s(t) = PRN_1(t) \cdot [\cos\theta_1 \cdot w_1(t) + \cos\theta_2 \cdot w_2(t)]/2 +$$
$$PRN_2(t) \cdot [\cos\theta_1 \cdot w_1(t) - \cos\theta_2 \cdot w_2(t)]/2 + i \cdot$$
$$[PRN_3(t) \cdot w_3(t) \cdot (\sin\theta_1 + \sin\theta_2)/2 + IM(t)],$$

where IM(t) is the inter-modulation product given by $$IM(t)=-PRN_1(t) \cdot PRN_2(t) \cdot PRN_3(t) \cdot w_3(t) \cdot (\sin\theta_2-\sin\theta_1)/2.$$

From the above equation, the following expression for s(t) derives:

$$s(t) = (PRN_1(t) + PRN_2(t)) \cdot \cos\theta_1 \cdot w_1(t)/2 +$$
$$(PRN_1(t) - PRN_2(t)) \cdot \cos\theta_2 \cdot w_2(t)/2 +$$
$$i \cdot [PRN_3(t) \cdot w_3(t) \cdot (\sin\theta_1 + \sin\theta_2)/2 + IM(t)]$$

Figure 2:
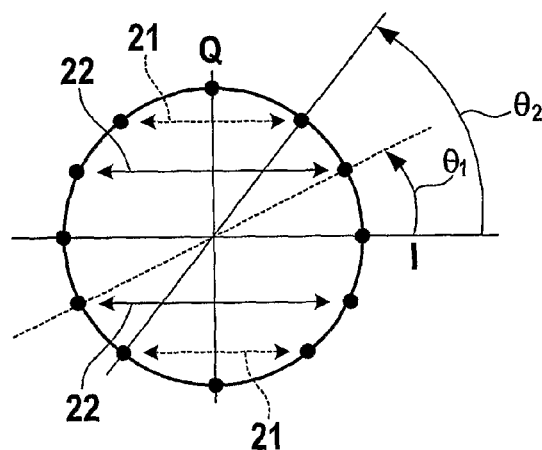
FIG. 2: is a phase diagram of an 8PSK modulation.
Figure 3:
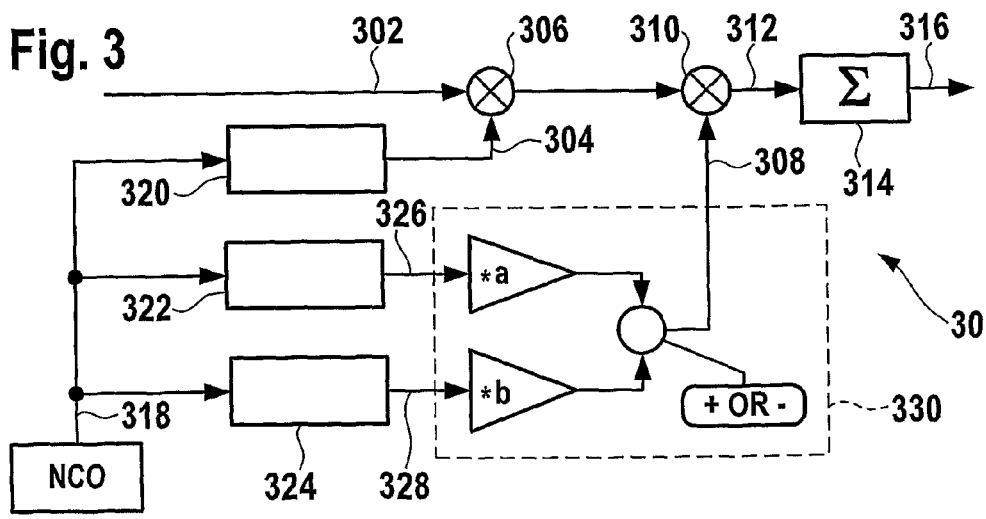
FIG. 3: is a block diagram showing a first receiver architecture.

Referring to FIG. 2, it follows that if $PRN_1(t)=PRN_2(t)$, the second term cancels out and the in-phase signal oscillates like $w_1(t)$ indicated by arrow 22; if $PRN_1(t)=-PRN_2(t)$, the first term cancels out and the in-phase signal oscillates like $w_2(t)$ indicated by arrow 21. This corresponds to an 8-phase-shift keying modulation (8PSK), which is indicated in the phase diagram of FIG. 2 by the angles $\theta_1$ and $\theta_2$. The angles $\theta_1$ and $\theta_2$ allow setting the power distribution between the two binary waveforms $w_1(t)$ and $w_2(t)$. As in the previous examples, the complex modulation s(t) has a constant envelope.

In the specific case of a Galileo E2-L1-E1 modulation of the L1 carrier, three signals are to be transmitted, one signal carrying the message of the L1 Open Service (OS), one pilot signal for the L1 Open Service and one binary signal for the Public Regulated Service. For each of the two Open Service signals an optimised spread spectrum signal as described above may be used. A suitable constant envelope modulation scheme for this application is described in the above example with three spreading waveforms.

Let the following notation apply:
code$_{OSP}$(t) is the pilot spreading code of the Open Service;
code$_{OSD}$(t) is the data or message spreading code of the Open Service, multiplied by the message;
$w_1(t)$ is a 1.023 MHz sine square waveform;
$w_2(t)$ is a 5.115 MHz sine square waveform or a more general binary waveform;
PRS(t) is the Public Regulated Service signal.

The resulting complex modulation can be expressed as $$s(t) = (code_{OSP}(t) + code_{OSD}(t)) \cdot \cos\theta_1 w_1(t)/2 + code_{OSP}(t) -$$
$$code_{OSD}(t)) \cdot \cos\theta_2 \cdot w_2(t)/2 + i \cdot$$
$$[PRS(t) \cdot (\sin\theta_1 + \sin\theta_2)/2 + IM(t)],$$

where the inter-modulation product IM(t) is given by $$IM(t) = code_{OSP}(t) \cdot code_{OSD}(t) \cdot PRS(t) \cdot (\sin\theta_2 - \sin\theta_1)/2.$$

At the receiver level, various implementations can be envisaged to acquire and track a spread-spectrum signal as seen in FIGS. 3-6. The receiver architecture 30 shown in FIG. 3 allows generation of a local replica of the spreading waveform 10 used for modulating the carrier wave. The incoming broadcast signals 302 are mixed with the local replica of the spreading waveform: first, a local code replica 304 is mixed to the incoming signals 302 in a first mixer 306; then, a replica of the unmodulated spreading waveform 308 is mixed to the incoming signals 302 in a second mixer 310. The resulting signal 312 is integrated over a certain time period in an integration stage 314. A correlation between the incoming electromagnetic waves and the local replica of the spreading waveform is performed. The correlation result 316 can be used in a feedback loop controlling the generation of the local replica.

A numerically controlled oscillator NCO provides a clock signal 318 to a code generator 320, and to two waveform generators 322, 324. The code generator 320 outputs a local code replica 304, which is a copy of a known part of the binary sequence used for modulating the linear combination of first and second waveforms of the signal, which is to be received. This binary sequence can, for instance, be a ranging code of a global navigation satellite system like GPS or Galileo. Basically, the receiver comprises a memory where the binary sequence is stored as such or an algorithm for reproducing the binary sequence is implemented therein. A combination of a stored sequence and an algorithm is also possible. The local code generator 320 outputs the local replica of the binary sequence 304 as a voltage, based on stored data or by executing an appropriate algorithm. The algorithm could e.g. be implemented by means of one or more linear feedback shift registers (LFSR) or other appropriate hardware.

The oscillator signal 318 is also provided to a first waveform generator 322 and a second waveform generator 324, which reproduce local copies of the known parts of the first respectively the second waveform linearly combined in the signal which is to be received. The first local waveform replica 326 and the second local waveform replica 328 are linearly combined in a combination stage 330 according to the combination scheme used for modulating the signal. The output of the combination stage 330 is mixed with the incoming electromagnetic waves in a mixer 310. The linear combination allows choosing the relative amplitudes a, b of the waveform replicas and whether a summation or a subtraction is performed.

The signals to be detected are generally offset in time with respect to the local replica of the spreading waveform; hence by integrating the incoming signal mixed with the local spreading waveform, the correlation of the incoming signal 302 and the local spreading waveform is computed. The correlation result 316 therefore indicates whether the incoming signal and the local spreading waveform overlap in time. The correlation result 316 may also be used as input for a feedback loop, which acts on the timing offset of the local spreading waveform with regard to an internal receiver clock. This timing offset can thus be optimised with regard to the correlation result 316.

In the receiver architecture 30 to the number of quantification levels used for the local spreading waveform is relevant. The number of quantification levels affects the relative amplitudes of the first waveform replica and the second waveform replica as it limits the number of combinations for combining the first and the second waveform replicas. In a typical satellite positioning receiver, the stages before integration use signals quantified on a reduced number of quantification levels so as to limit the system complexity and power consumption of these stages. The receiver architecture 40 shown in FIG. 4 shows a way on how to circumvent the quantification problem before integration.

Figure 4:
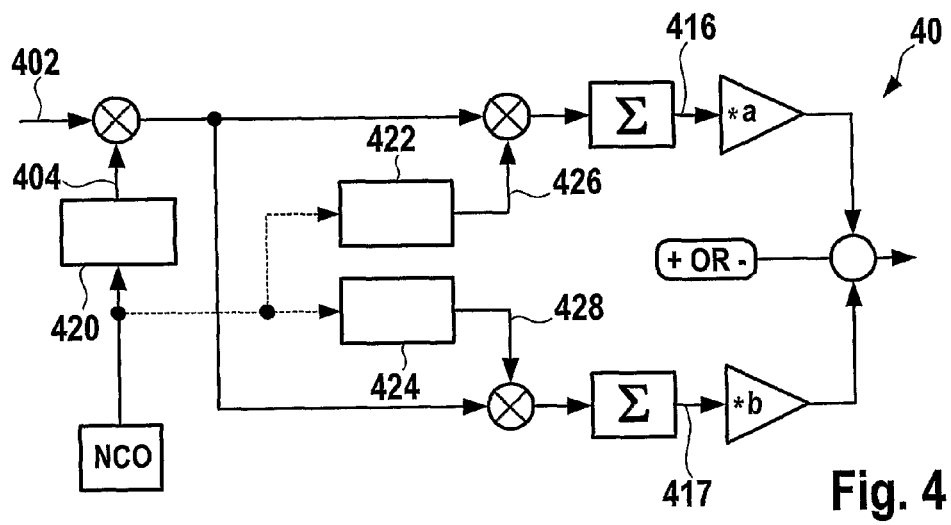
FIG. 4: is a block diagram showing an alternative receiver architecture.

In FIG. 4, a code generator 420 outputs a local code replica 404, which is a copy of a known part of the binary sequence. The first waveform generator 422 and the second waveform generator 424 produce local copies of the known parts of the first respectively the second waveform. In this embodiment, incoming broadcast signal 402 is correlated with the local code replica 404 and the first waveform replica 426 in a first correlation branch and with the local code replica 404 and the second waveform replica 428 in a second correlation branch. The first correlation result 416 and the second correlation result 417 are then linearly combined according to the received spread-spectrum signal. From a mathematical viewpoint, the linear combination and the correlation can be performed in either order, as the correlation itself is a linear operation. In the signal processing architecture, however, the number of quantification levels for replica generation can now be reduced in the stage preceding integration. If the first and the second replica waveforms are binary waveforms, two quantification levels are sufficient. The number of quantification levels behind the integration stage is usually much higher, as a result of which the effects of quantification on the relative amplitudes of the correlation results are less important. The correlation results can be fed to one or more tracking loops, which control the timing offset of the waveform replicas with regard to a receiver clock, as detailed below.

For Galileo Open Service transmitted in the L1 frequency band, a spreading waveform comprising a linear combination of a BOC(1, 1) and a binary waveform at a rate of 10.23 Mcps, 15.345 Mcps or 30.69 Mcps appears to be an advantageous choice because of good tracking performances and good spectral isolation with regard to the GPS M-signal. The parameters of the receiver architectures presented in FIG. 3 and FIG. 4 can be adapted for specifically receiving such a global positioning signal. As an example, the first waveform generator generates a 1.023 MHz square waveform, while the second waveform generator generates a 5.115 MHz square waveform. If interoperability with the GPS signal is sought, a receiver architecture according to FIG. 4 may be preferred to the receiver architecture according to FIG. 3.

Figure 5:
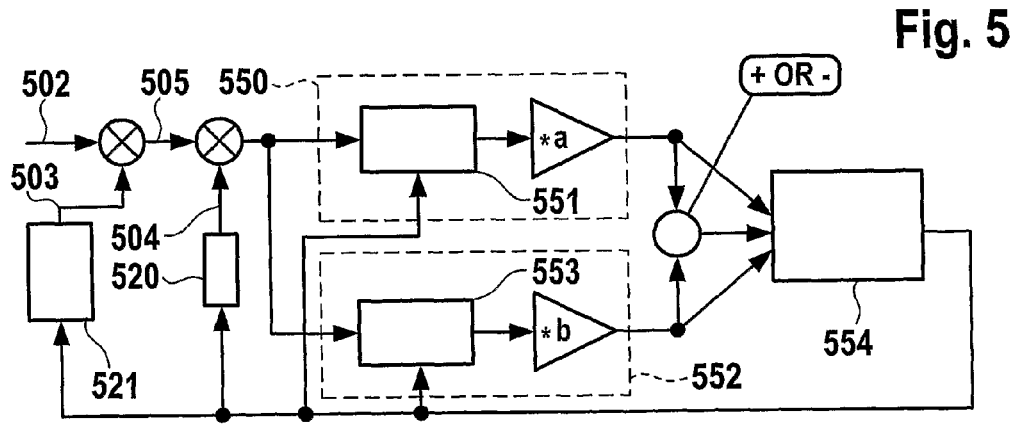
FIG. 5: is a block diagram of a first signal tracking configuration for the receiver architecture of FIG. 4.
Figure 6:
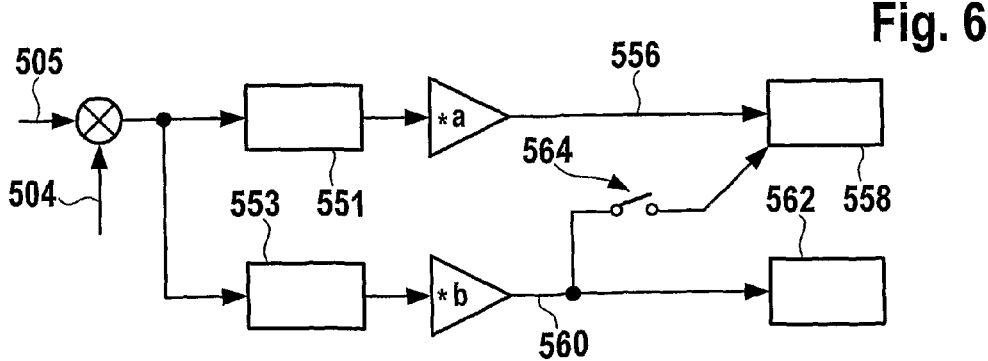
FIG. 6: is a block diagram of a second signal tracking configuration for the receiver architecture of FIG. 4.

FIG. 5 and FIG. 6 show different signal tracking architectures, which can be implemented into a receiver. In the architecture of FIG. 5, incoming broadcast signal 502 is multiplied with a local carrier wave 503 produced by the local carrier generator 521 in order to wipe off the incoming signal carrier wave. The resulting signal 505 is then correlated with the local code replica 504 and the first waveform replica in a first correlation branch 550. Similarly, after multiplication with the local carrier wave, the incoming broadcast signal 502 is also correlated with the local code replica 504 and the second waveform replica in a second correlation branch 552. The two correlation signals and their linear combination are provided to a tracking loop 554 comprising a phase-locked loop and a delay-locked loop. The feedback signal is fed to the first correlator 551, the second correlator 553, the code generator 520 and to the local carrier generator 521. As will be appreciated, this tracking architecture can provide synchronisation between local waveform replicas and the broadcast signal.

In FIG. 6, each correlation result can be treated separately: the first correlation result 556 is fed into a phase-locked loop 558, while the second correlation result 560 is fed into a delay-locked loop 562. A switch 564 is provided allowing combination of the first and the second correlation result, which combination is then fed into the phase-locked loop 558. The feedback signal of the delay-locked loop 562 can be fed back to the first correlator 551 and the second correlator 553 and to the local oscillator, which controls replica generation. The feedback signal of the phase locked loop 558 can be used for carrier wave removal (not shown).

As will be appreciated by the ones skilled in the art, a navigation signal receiver may comprise more than one receiver architecture as shown in FIGS. 3 to 6. In such a receiver, several local code replicas, first and second waveform replicas can be generated respectively in parallel, with different delays to the local clock signal. Correlation results corresponding to the different delays are then fed into the tracking loop, which makes finding the correct delay faster and more efficient in general.

From various considerations, it may sometimes appear appropriate to adapt the processing bandwidth of the receiver to the lower waveform rate alone. In this case, only the first waveform can be acquired and processed. The reference signal in the receiver would be the replica of the first waveform. This acquisition technique offers higher simplicity and lower power consumption. Once the first waveform is acquired, the receiver can switch to the optimal processing mode, in which the two waveforms are acquired.

The invention claimed is:

1. A method of receiving a spread spectrum signal, comprising:

receiving incoming electromagnetic waves of said spread spectrum signal, said spread spectrum signal comprising a carrier wave and at least one spreading waveform, which modulates said carrier wave; said spreading waveform comprising a real linear combination of a first binary waveform at a first waveform rate and a second binary waveform at a second waveform rate; said first waveform rate being distinct from said second waveform rate and both waveform rates being non-zero; said linear combination being modulated with a binary sequence comprising a signal identification code and said modulated linear combination being of the form $$[\alpha \cdot w_1(t) + \beta \cdot w_2(t)] \cdot PRN(t),$$

where t represents a time variable, $w_1(t)$ said first binary waveform, $w_2(t)$ said second binary waveform, $\alpha$ and $\beta$ non-zero coefficients and PRN(t) said binary sequence comprising the signal identification code;

generating a local code replica of said binary sequence;
generating a local replica of said first waveform;
generating a local replica of said second waveform;
performing a first correlation of said incoming electromagnetic waves with said local replica of said first waveform and said local code replica;
performing a second correlation of said incoming electromagnetic waves with said local replica of said second waveform and said local code replica; and
linearly combining said first correlation and said second correlation.

2. A method of receiving a spread spectrum signal, comprising:

receiving incoming electromagnetic waves of said spread spectrum signal, said spread spectrum signal comprising a carrier wave and at least one spreading waveform, which modulates said carrier wave; said spreading waveform comprising a real linear combination of a first binary waveform at a first waveform rate and a second binary waveform at a second waveform rate; said first waveform rate being distinct from said second waveform rate and both waveform rates being non-zero; said linear combination being modulated with a binary sequence comprising a signal identification code and said modulated linear combination being of the form $$[\alpha \cdot w_1(t) + \beta \cdot w_2(t)] \cdot PRN(t),$$

where t represents a time variable, $w_1(t)$ said first binary waveform, $w_2(t)$ said second binary waveform, $\alpha$ and $\beta$ non-zero coefficients and PRN(t) said binary sequence comprising the signal identification code;

generating a local code replica of said binary sequence;
generating a local replica of said first waveform;
generating a local replica of said second waveform;
performing a linear combination of said local replica of said first waveform with said local replica of said second waveform; and
correlating said incoming electromagnetic waves with said linear combination of local replicas and said local code replica.

3. A receiver for receiving a spread-spectrum signal, comprising:

an input device to receive incoming electromagnetic waves of said spread spectrum signal, said spread spectrum signal comprising a carrier wave and at least one spreading waveform, which modulates said carrier wave; said spreading waveform comprising a real linear combination of a first binary waveform at a first waveform rate and a second binary waveform at a second waveform rate; said first waveform rate being distinct from said second waveform rate and both waveform rates being non-zero; said linear combination being modulated with a binary sequence comprising a signal identification code and said modulated linear combination being of the form $$[\alpha \cdot w_1(t) + \beta \cdot w_2(t)] \cdot PRN(t),$$

where t represents a time variable, $w_1(t)$ said first binary waveform, $w_2(t)$ said second binary waveform, $\alpha$ and $\beta$ non-zero coefficients and PRN(t) said binary sequence comprising the signal identification code;

a code generator generating a local code replica of said binary sequence;
a first waveform generator generating a local replica of said first waveform;
a second waveform generator generating a local replica of said second waveform;
a correlator correlating said incoming electromagnetic waves with said local replica of the first waveform and said local code replica so as to form a first correlation result;
a correlator correlating said incoming electromagnetic waves with said local replica of the second waveform and said local code replica so as to form a second correlation result; and
a combiner linearly combining said first and second correlation results.

4. A receiver according to claim 3, comprising a tracking loop to track said received signal.

5. A receiver according to claim 4, wherein said tracking loop comprises at least one of a delay-locked loop, a phase-locked loop and a frequency-locked loop.

6. A receiver according to claim 4, wherein said tracking loop comprises
a delay-locked loop, said delay-locked loop being arranged so as to be capable of tracking said first waveform, and
at least one of a phase-locked loop and a frequency-locked loop, said at least one of a phase-locked loop and a frequency-locked loop being arranged so as to be capable of tracking said second waveform.

7. A receiver according to claim 4, wherein said tracking loop comprises
a delay-locked loop, said delay-locked loop being arranged so as to be capable of tracking at least one of said first waveform and said second waveform, and
at least one of a phase-locked loop and a frequency-locked loop, said at least one of a phase-locked loop and a frequency-locked loop being arranged so as to be capable of tracking said linear combination of said first and second waveform.

8. A receiver according to claim 3, wherein said first waveform generator is capable of generating a BOC(1, 1) waveform, wherein said second waveform generator is capable of generating a binary waveform having a rate chosen among 10.23 Mcps, 12.276 Mcps, 15.345 Mcps and 30.69 Mcps and wherein said local code replica comprises satellite identification data.

9. A receiver for receiving a spread-spectrum signal, comprising:
an input device to receive incoming electromagnetic waves of said spread spectrum signal; said spread spectrum signal comprising a carrier wave and at least one spreading waveform, which modulates said carrier wave; said spreading waveform comprising a real linear combination of a first binary waveform at a first waveform rate and a second binary waveform at a second waveform rate; said first waveform rate being distinct from said second waveform rate and both waveform rates being non-zero; said linear combination being modulated with a binary sequence comprising a signal identification code and said modulated linear combination being of the form $$[\alpha \cdot w_1(t) + \beta \cdot w_2(t)] \cdot \mathrm{PRN}(t),$$

where t represents a time variable, $w_1(t)$ said first binary waveform, $w_2(t)$ said second binary waveform, $\alpha$ and $\beta$ non-zero coefficients and PRN(t) said binary sequence comprising the signal identification code;
a code generator generating a local code replica of said binary sequence;
a first waveform generator generating a local replica of said first waveform;
a second waveform generator generating a local replica of said second waveform;
a combiner forming a linear combination of said local replica of the first waveform and said local replica of the second waveform; and
a correlator correlating said incoming electromagnetic waves with said linear combination of local replicas and said local code replica.

10. A receiver according to claim 9, comprising a tracking loop to track said received signal.

11. A receiver according to claim 10, wherein said tracking loop comprises a delay-locked loop and/or a phase-locked loop and/or a frequency-locked loop.

12. A receiver according to claim 10, wherein said tracking loop comprises
a delay-locked loop, said delay-locked loop being arranged so as to be capable of tracking said first waveform, and
at least one of a phase-locked loop and a frequency-locked loop, said at least one of a phase-locked loop and a frequency-locked loop being arranged so as to be capable of tracking said second waveform.

13. A receiver according to claim 10, wherein said tracking loop comprises
a delay-locked loop, said delay-locked loop being arranged so as to be capable of tracking at least one of said first waveform and said second waveform, and
at least one of a phase-locked loop and a frequency-locked loop, said at least one of a phase-locked loop and a frequency-locked loop being arranged so as to be capable of tracking said linear combination of said first and second waveform.

14. A receiver according to claim 9, wherein said first waveform generator is capable of generating a BOC(1, 1) waveform, wherein said second waveform generator is capable of generating a binary waveform having a rate chosen among 10.23 Mcps, 12.276 Mcps, 15.345 Mcps and 30.69 Mcps and wherein said local code replica comprises satellite identification data.

15. A method for producing a spread-spectrum signal, said spread spectrum signal comprising a carrier wave and at least one spreading waveform, which modulates said carrier wave; said spreading waveform comprising a real linear combination of a first binary waveform at a first waveform rate and a second binary waveform at a second waveform rate; said first waveform rate being distinct from said second waveform rate and both waveform rates being non-zero; said linear combination being modulated with a binary sequence comprising a signal identification code and said modulated linear combination being of the form $$[\alpha \cdot w_1(t) + \beta \cdot w_2(t)] \cdot \mathrm{PRN}(t),$$

where t represents a time variable, $w_1(t)$ said first binary waveform, $w_2(t)$ said second binary waveform, $\alpha$ and $\beta$ non-zero coefficients and PRN(t) said binary sequence comprising the signal identification code;
said method comprising:
providing a carrier wave;
providing a spreading waveform, said providing a spreading waveform including:
providing a first waveform at said first waveform rate and a second waveform at said second waveform rate; said first waveform rate being distinct from said second waveform rate;
providing a binary sequence comprising at least one signal identification code;
forming a modulated linear combination of said first waveform and said second waveform, said modulated linear combination being of the form $$[\alpha \cdot w_1(t) + \beta \cdot w_2(t)] \cdot \mathrm{PRN}(t),$$

where t represents a time variable, $w_1(t)$ said first binary waveform, $w_2(t)$ said second binary waveform, $\alpha$ and $\beta$ non-zero coefficients and PRN(t) said binary sequence comprising the signal identification code; and
modulating the carrier wave with said spreading waveform.

16. A method according to claim 15, wherein at least one of said first waveform and said second waveform is chosen among a binary offset carrier waveform and a binary coded symbol waveform.

17. A method according to claim 15, wherein said providing a spreading waveform includes modulating said second waveform with a secondary binary sequence different from the binary sequence modulating said linear combination of waveforms.

18. A navigation signal system comprising:
a receiver configured to receive a spread-spectrum signal, said spread spectrum signal comprising a carrier wave and at least one spreading waveform, which modulates said carrier wave; said spreading waveform comprising a real linear combination of a first binary waveform at a first waveform rate and a second binary waveform at a second waveform rate; said first waveform rate being distinct from said second waveform rate and both waveform rates being non-zero; said linear combination being modulated with a binary sequence comprising a signal identification code and said modulated linear combination being of the form $$[\alpha \cdot w_1(t) + \beta \cdot w_2(t)] \cdot PRN(t),$$

where t represents a time variable, $w_1(t)$ said first binary waveform, $w_2(t)$ said second binary waveform, $\alpha$ and $\beta$ non-zero coefficients and PRN(t) said binary sequence comprising the signal identification code;
and said first waveform being a BOC(1, 1) and said second waveform is a binary waveform having a rate selected among 10.23 Mcps, 12.276 Mcps, 15.345 Mcps and 30.69 Mcps.

19. A navigation signal system according to claim 18, wherein said binary sequence comprises satellite identification data.

20. A navigation signal system according to claim 18, wherein said binary sequence comprises satellite information data.

21. A system to receive a spread-spectrum signal, said system comprising:
a signal generator configured to generate said spread spectrum signal, said spread spectrum signal comprising a carrier wave and at least one spreading waveform, which modulates said carrier wave,
wherein said spreading waveform comprises a real linear combination of a first binary waveform at a first waveform rate and a second binary waveform at a second waveform rate; said first waveform rate being distinct from said second waveform rate and both waveform rates being non-zero;
said linear combination being modulated with a binary sequence comprising a signal identification code and said modulated linear combination being of the form $$[\alpha \cdot w_1(t) + \beta \cdot w_2(t)] \cdot PRN(t),$$

where t represents a time variable, $w_1(t)$ said first binary waveform, $w_2(t)$ said second binary waveform, $\alpha$ and $\beta$ non-zero coefficients and PRN(t) said binary sequence comprising the signal identification code; and
a receiver to receive said spread spectrum signal.

22. A system according to claim 21, wherein said first waveform and/or said second waveform are binary offset carrier (BOC) waveforms or binary coded symbol waveforms.

23. A system according to claim 21, wherein said second waveform rate is an integer multiple of said first waveform rate.

24. A system according to claim 21, wherein said binary sequence further comprises information data.

25. A system according to claim 21, wherein said binary sequence comprises code chips at a certain chip rate, said first waveform rate being such that Fsc=m·Rc/2, where m is an integer number, Rc is said chip rate and Fsc is said first waveform rate.

26. A system according to claim 21, wherein said carrier wave has an in-phase component and a quadrature component, wherein said in-phase component is modulated with a first spreading waveform $s_1(t)$, which is of the form $$s_1(t) = [a \cdot w_1(t) + b \cdot w_2(t)] \cdot PRN_1(t)$$

and wherein said quadrature component is modulated with a second spreading waveform $s_2(t)$, which is of the form $$s_2(t) = [a \cdot w_1(t) - b \cdot w_2(t)] \cdot PRN_2(t),$$

with t being a time variable, a and b being real, non-zero coefficients, $w_1(t)$ being a first binary waveform at a first waveform rate, $w_2(t)$ being a second binary waveform at a second waveform rate, said first waveform rate being distinct from said second waveform rate, $PRN_1(t)$ being a first binary sequence and $PRN_2(t)$ being a second binary sequence.

27. A system according to claim 21, wherein said carrier wave has an in-phase component and a quadrature component, wherein said in-phase component is modulated with a first spreading waveform $s_1(t)$, which is of the form $$s_2(t) = (\sin\theta_1 + \sin\theta_2) \cdot PRN_3(t) \cdot w_3(t)/2 -$$
$$PRN_1(t) \cdot PRN_2(t) \cdot PRN_3(t) \cdot w_3(t) \cdot (\sin\theta_2 - \sin\theta_1)/2,$$

wherein said quadrature component is modulated with a second spreading waveform $s_2(t)$, which is of the form $$s_1(t) = PRN_1(t) \cdot (\cos\theta_1 \cdot w_1(t) + \cos\theta_2 \cdot w_2(t))/2 +$$
$$PRN_2(t) \cdot (\cos\theta_1 \cdot w_1(t) - \cos\theta_2 \cdot w_2(t))/2,$$

with t being a time variable, $\theta_1$ and $\theta_2$ being real angles, $w_1(t)$ being a first binary waveform at a first waveform rate, $w_2(t)$ being a second binary waveform at a second waveform rate, said first waveform rate being distinct from said second waveform rate, $w_3(t)$ being a third binary waveform, $PRN_1(t)$ being a first binary sequence, $PRN_2(t)$ being a second binary sequence and $PRN_3(t)$ being a third binary sequence.

* * * * *